March 7, 1961 H. O. SCHEKOWSKI 2,973,577
WINDSHIELD WIPER BLADE TRIMMING DEVICE
Filed Sept. 11, 1959 2 Sheets-Sheet 2
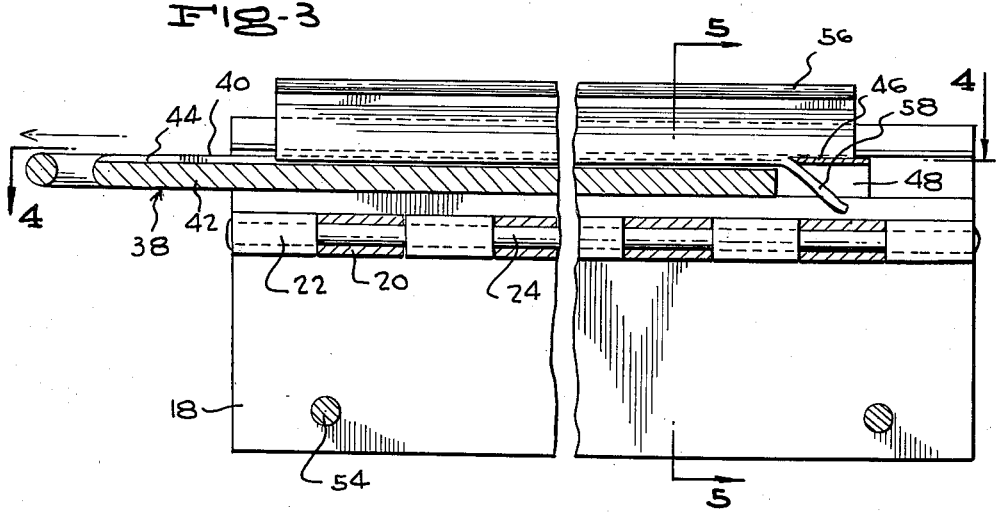
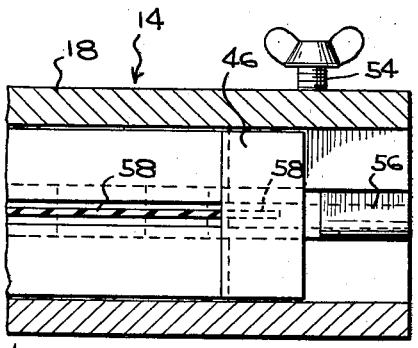
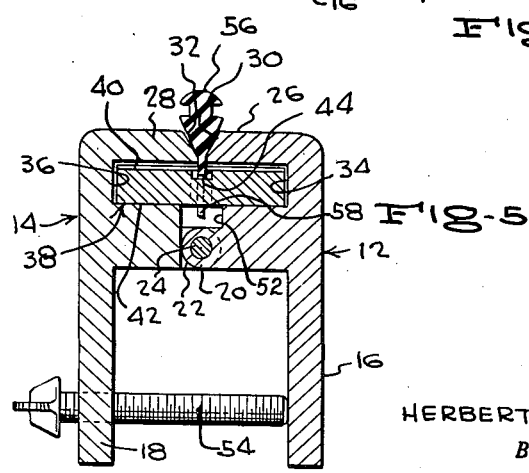
*INVENTOR.*
HERBERT O. SCHEKOWSKI
BY
McMorrow, Berman & Davidson
ATTORNEYS United States Patent Office 2,973,577
Patented Mar. 7, 1961

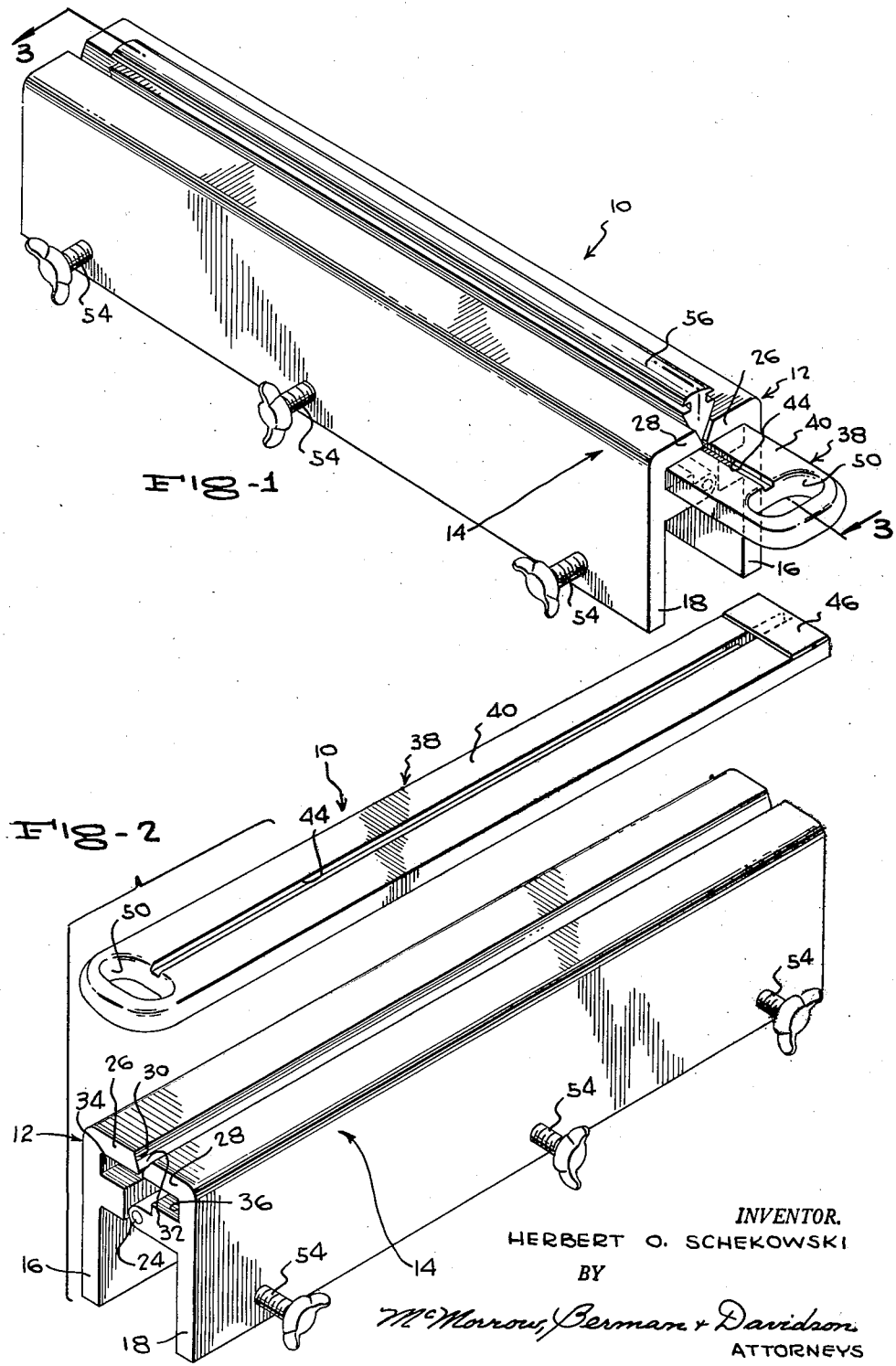

2,973,577

WINDSHIELD WIPER BLADE TRIMMING DEVICE

Herbert O. Schekowski, 4628 S. Rockwell, Chicago 32, Ill.

Filed Sept. 11, 1959, Ser. No. 839,483

4 Claims. (Cl. 30—272)

The present invention relates to a device for trimming windshield wiper blades.

Presently in use on automotive vehicles are windshield wiper blades fabricated of resilient material such as rubber or the like. Due to the curvature of the windshields of the current and recently manufactured vehicles, the windshield wiper blades are subjected to constant flexing when in use. The working edge portions of such blades are subjected to wear due to the road dirt which accumulates on the windshields and is cleaned therefrom by the blades. Blades which are thin enough and resilient enough to stand the constant flexing without damage are too thin and too flexible to be supported, for trimming of the working edge portion, by any means heretofore proposed.

An object of the present invention is to provide a device for trimming the working edge portion of a windshield wiper blade.

Another object of the present invention is to provide a device for trimming the working edge portion of a windshield wiper blade which lends itself to trimming of such blade with neatness and dispatch, one which may be used to trim a windshield wiper blade without removal of the blade from the support arm adjacent a windshield, and one which is highly effective in action.

A further object of the present invention is to provide a device for trimming the working edge portion of a windshield wiper blade which is simple in structure, one which lends itself to economical manufacture and assembly, and one which is highly effective in action.

These and other objects and advantages of the present invention will be fully apparent from the following description when taken in conjunction with the annexed drawings, in which:

Figure 1 is an isometric view of the device of the present invention with a windshield wiper blade inserted therein and with the trimming element in a position prior to cutting of the blade;

Figure 2 is an isometric exploded view of the device of the present invention showing the trimming element removed from the jaw members of the device;

Figure 3 is a view on an enlarged scale, with central portions broken away, taken on the line 3—3 of Figure 1;

Figure 4 is a view taken on the line 4—4 of Figure 3; and

Figure 5 is a view taken on the line 5—5 of Figure 3.

Referring in detail to the drawings, in which like numerals indicate like parts throughout the several views, the device of the present invention is designated generally by the reference numeral 10 and comprises a pair of elongated jaw members 12 and 14 arranged in confronting face to face relation.

Legs 16 and 18, arranged in parallel spaced relation, project from the lower ends of the jaw members 12 and 14, respectively.

Means, embodying hinge sleeves 20, projecting from the inner face of the leg 16 and other hinge sleeves 22 projecting from the leg 18, together with a hinge pin 24 which is received in the sleeves 20 and 22, connect the jaw members 12 and 14 together for rocking movement toward and away from each other.

The upper end portions of the jaw members 12 and 14 embody flanges 26 and 28, respectively, which face each other and which terminate in beveled edges 30 and 32. The edges 30 and 32 extend from one end to the other end of the jaw members 12 and 14, respectively. Below the edge 30 is an inwardly extending channel-shaped groove 34 parallel to the beveled edge 30 and below the beveled edge 32 is another inwardly extending channel-shaped groove 36 parallel to the edge 32. The grooves 34 and 36 extend from one end to the other end of the jaw members 12 and 14, respectively.

The jaw members 12 and 14 are arranged so that the beveled edges 30 and 32 are in lateral spaced alignment and form an open ended V-shaped slot open at the apex. The jaw members 12 and 14 are arranged so that the grooves 34 and 36 are in face to face registering relation and form with each other an open ended slideway.

The present invention provides a trimming element 38 having a flat upper face 40 and a flat lower face 42. The element 38 is conformably shaped to fit within the slideway formed by the grooves 34 and 36 and is provided on its upper face 40 with a recess 44 extending longitudinally along and inwardly from the face 40.

A knife 46 extends transversely across and bridges the recess 44 adjacent one end of the trimming element 38. The knife 46 is fixedly secured to and supported on the element 38.

The portion of the bottom of the recess 44 adjacent and below the knife 46 is cut away to provide a discharge opening, as at 48 in Figure 3. The portion of the trimming element 38 remote from the knife 46 is provided with an eye formation 50 which forms a handle for the trimming element 38.

The portions of the jaw members 12 and 14 immediately above their hinge sleeves 20 and 22 are cut away to form a channel 52, as shown most clearly in Figure 5.

Means is carried by the leg 18 engageable with the leg 16 for holding the jaw members 12 and 14 in the position of rocking movement relative to each other. Specifically, this means consists in a thumb bolt 54 disposed inwardly of each end of the device 10 and another thumb bolt 54 at the midpart of the device 10 and threaded in a threaded bore 56 provided in the leg 18. The free end of each thumb bolt 54 bears against the inner face of the leg 16 and forces the legs 16 and 18 apart to bring together the free ends of the flanges 26 and 28 of the jaw members 12 and 14, respectively.

In use, a windshield wiper blade 56 is positioned so that the working edge portion 58 thereof projects through the apex bottom of the slot provided by the beveled edges 30 and 32 and into the recess 44 provided in the upper face 40 of the trimming element 38. Parts of the blade 56 adjacent the working edge are slidably engaged by the walls of the slot provided by the beveled edges 30 and 32. Upon withdrawing of the trimming element 38 through the open end of the slideway provided by the grooves 34 and 36, the working edge portion of the wiper blade 56 is severed by the knife 46 and the trimmed off portion of the blade 56 is ejected through the discharge opening 48 into the channel 52 from which it is later removed when the jaws 12 and 14 are released and sprung apart from each other.

When the wiper blade 56 is positioned within the space between the free ends of the jaw members 12 and 14 with the working edge portion projecting into the recess 44, the blade 56 is held in this position by tightening of the thumb bolts 54 to force the legs 16 and 18 of the jaw members 12 and 14 apart from each other and force the beveled edges 30 and 32 of the flanges 26 and 28 toward each other. This grips the thin portion of the wiper blade 56 tightly and permits the trimming of the one working edge portion 58 to a new working edge which, when the blade 56 is replaced in its supporting windshield wiper arm, will wipe the associated windshield clean of rain and snow and accumulated dirt as when the blade was new.

What is claimed is:

1. A device for trimming the working edge portion of a windshield wiper blade comprising a pair of elongated jaw members arranged in confronting face to face relation, means connecting said jaw members together for movement toward and away from each other, each of said jaw members having an edge and an inwardly extending channel-shaped groove below and parallel to said edge extending from one end to the other end thereof, said jaw members being arranged so that said edges are in lateral spaced alignment to form therebetween a slot and the grooves in face to face registering relation to form an open ended slideway, and a flat faced trimming element conformably shaped to fit within said slideway and having a recess extending longitudinally along and inwardly from one face thereof and a knife extending transversely across and bridging said recess adjacent one end thereof and fixedly supported on said element, said trimming element being positioned in said slideway so that the recess is below and in registry with said slot with the knife contiguous to and inwardly of the other open end of said slideway and being insertable and withdrawable through one of the open ends of said slideway, said slot and the recess of said trimming element when the latter is fully inserted in said slideway being adapted to receive a windshield wiper blade from which the working edge portion is to be trimmed.

2. A device for trimming the working edge portion of a windshield wiper blade comprising a pair of elongated jaw members arranged in confronting face to face relation, means connecting said jaw members together for movement toward and away from each other, each of said jaw members having a beveled edge and an inwardly extending channel-shaped groove below and parallel to said beveled edge extending from one end to the other end thereof, said jaw members being arranged so that said beveled edges are in lateral spaced alignment to form therebetween a V-shaped slot open at the apex and the grooves in face to face registering relation to form an open ended slideway, and a flat faced trimming element conformably shaped to fit within said slideway and having a recess extending longitudinally along and inwardly from one face thereof and a knife extending trasversely across and bridging said recess adjacent one end thereof and fixedly supported on said element, said trimming element being positioned in said slideway so that the recess is below and in registry with the open apex of said V-shaped slot with the knife contiguous to and inwardly of the other open end of said slideway and being insertable and withdrawable through one of the open ends of said slideway, said V-shaped slot and the recess of said trimming element when the latter is fully inserted in said slideway being adapted to receive a windshield wiper blade from which the working edge portion is to be trimmed.

3. A device for trimming the working edge portion of a windshield wiper blade comprising a pair of elongated jaw members arranged in confronting face to face relation, means connecting said jaw members together for rocking movement toward and away from each other, means carried by one of said jaw members and engageable with the other of said jaw members for holding said jaw members in a position of rocking movement relative to each other, each of said jaw members having an edge and an inwardly extending channel-shaped groove below and parallel to said edge extending from one end to the other end thereof, said jaw members being arranged so that said edges are in lateral spaced alignment to form therebetween a slot and the grooves in face to face registering relation to form an open ended slideway, and a flat faced trimming element conformably shaped to fit within said slideway and having a recess extending longitudinally along and inwardly from one face thereof and a knife extending transversely across and bridging said recess adjacent one end thereof and fixedly supported on said element, said trimming element being positioned in said slideway so that the recess is below and in registry with said slot with the knife contiguous to and inwardly of the other open end of said slideway and being insertable and withdrawable through one of the open ends of said slideway, said slot and the recess of said trimming element when the latter is fully inserted in said slideway being adapted to receive a windshield wiper blade from which the working edge portion is to be trimmed.

4. A device for trimming the working edge portion of a windshield wiper blade comprising a pair of elongated jaw members arranged in confronting face to face relation, a leg projecting from each of said jaw members, means connecting said jaw members together for rocking movement toward and away from each other, means carried by one of said legs and engageable with the other of said legs for holding said jaw members in a position of rocking movement relative to each other, each of said jaw members having an edge and an inwardly extending channel-shaped groove below and parallel to said edge extending from one end to the other end thereof, said jaw members being arranged so that said edges are in lateral spaced alignment to form therebetween a slot and the grooves in face to face registering relation to form an open ended slideway, and a flat faced trimming element conformably shaped to fit within said slideway and having a recess extending longitudinally along and inwardly from one face thereof and a knife extending transversely across and bridging said recess adjacent one end thereof and fixedly supported on said element, said trimming element being positioned in said slideway so that the recess is below and in registry with said slot with the knife contiguous to and inwardly of the other open end of said slideway and being insertable and withdrawable through one of the open ends of said slideway, said slot and the recess of said trimming element when the latter is fully inserted in said slideway being adapted to receive a windshield wiper blade from which the working edge portion is to be trimmed.

References Cited in the file of this patent

UNITED STATES PATENTS

| | | |
|---|---|---|
| 1,344,169 | Buckingham | June 22, 1920 |
| 1,895,754 | Finkenwirth | Jan. 31, 1933 |